US005767654A

United States Patent [19]
Menegoli et al.

[11] Patent Number: 5,767,654
[45] Date of Patent: Jun. 16, 1998

[54] APPARATUS AND METHOD FOR DETECTING MOTOR POSITION IN PWM OPERATION OF A POLYPHASE DC MOTOR

[75] Inventors: Paolo Menegoli, Milpitas; Chinh Nguyen, Sunnyvale, both of Calif.

[73] Assignee: SGS-Thomson Microelectronics, Inc., Carrollton, Tex.

[21] Appl. No.: 756,058

[22] Filed: Nov. 26, 1996

[51] Int. Cl.⁶ .................................................. H02P 5/28
[52] U.S. Cl. .......................... 318/811; 318/798; 318/815; 318/254; 318/138; 318/439; 318/599; 388/811
[58] Field of Search ........................... 318/254, 138, 318/439, 798–815, 599; 388/811

[56] References Cited

U.S. PATENT DOCUMENTS

| | | | |
|---|---|---|---|
| 3,564,273 | 2/1971 | Cockrell | 318/599 X |
| 3,749,891 | 7/1973 | Burrows et al. | 235/150.1 |
| 4,044,296 | 8/1977 | Dhyanchand et al. | 322/25 |
| 4,371,803 | 2/1983 | Schindel et al. | 310/242 |
| 4,389,588 | 6/1983 | Rankin | 310/242 |
| 4,683,529 | 7/1987 | Bucher, II | 363/44 |
| 4,843,297 | 6/1989 | Landino et al. | 318/811 |
| 4,868,441 | 9/1989 | Bulick | 310/239 |
| 5,068,582 | 11/1991 | Scott | 318/254 |
| 5,153,492 | 10/1992 | Landseadel | 318/599 |
| 5,172,036 | 12/1992 | Cameron | 318/138 |
| 5,202,614 | 4/1993 | Peters et al. | 318/254 |
| 5,202,616 | 4/1993 | Peters et al. | 318/254 |
| 5,231,338 | 7/1993 | Bulgarelli et al. | 318/254 |
| 5,233,275 | 8/1993 | Danino | 318/254 |
| 5,258,695 | 11/1993 | Utenick et al. | 318/138 |
| 5,258,696 | 11/1993 | Le | 318/254 |
| 5,285,135 | 2/1994 | Carobolante et al. | 318/254 |
| 5,294,877 | 3/1994 | Cameron . | |
| 5,309,078 | 5/1994 | Cameron . | |
| 5,317,243 | 5/1994 | Cameron | 318/254 |
| 5,319,289 | 6/1994 | Austin et al. | 318/254 |
| 5,329,198 | 7/1994 | Schmidt et al. | 310/247 |
| 5,343,127 | 8/1994 | Maiocchi | 318/254 |
| 5,388,176 | 2/1995 | Dykstra et al. | 388/811 |
| 5,414,317 | 5/1995 | Reid et al. | 310/239 |
| 5,423,192 | 6/1995 | Young et al. | 62/228.4 |
| 5,434,463 | 7/1995 | Horski | 310/248 |
| 5,491,978 | 2/1996 | Young et al. | 62/126 |
| 5,504,402 | 4/1996 | Menegoli . | |
| 5,506,487 | 4/1996 | Young et al. | 318/811 |
| 5,543,697 | 8/1996 | Carobolante et al. . | |

OTHER PUBLICATIONS

U.S. application No. 08/772,383, Carobolante et al., filed Dec. 23, 1996.
IEEE Transactions on Consumer Electronics, vol. 35, No. 3, Aug., 1989, "A Full–Wave Motor Drive IC Based on the Back–EMF Sensing Principle," Bahlmann, pp. 415–420.
Electronic Components and Applications, vol. 10, No. 3, "Full–Wave Sensorless Drive ICs for Brushless DC Motors," Dominique Pouilloux, pp. 2–11.
Proceedings of the Conference on Drives/Motors/Controls 1984, Paraskeva et al., "Microprocessor Control of a Brushless DC Motor".
Self Synchronisation of PM Step and Brushless Motors; A New Sensorless Approach, Antognini et al.
Gariboldi, "Motion Control", appearing in *Smart ICs*, Murari et al., Eds. 1995, Chapter 6, pp.225–283.

*Primary Examiner*—Karen Masih
*Attorney, Agent, or Firm*—Steve D. Beyer; Theodore E. Galanthay; Lisa K. Jorgenson

[57] ABSTRACT

A pulse width modulated (PWM) motor drive with back EMF monitoring of the floating phase of a polyphase motor is arranged so that zero crossings of the back EMF can be read without interference by PWM switching. A measure is taken of an interval between two zero crossings and, in the next interval, the PWM switching is stopped near to and before the next expected zero crossing, based on the time of the last prior interval. A period counter counts up during the first interval and another counter, loaded with the previous count reached by the period counter, counts down at the same rate during the second interval until a certain number is reached, near to but before zero, to generate a signal that results in stopping PWM switching until after the next zero crossing is detected.

31 Claims, 2 Drawing Sheets

APPARATUS AND METHOD FOR DETECTING MOTOR POSITION IN PWM OPERATION OF A POLYPHASE DC MOTOR

BACKGROUND OF THE INVENTION

1. Field of the Invention

This invention relates to motor controlling circuitry and is particularly related to control including use of back EMF signals from a floating coil of a polyphase DC motor.

2. Description of Related Art

Polyphase DC motors, particularly three phase brushless, sensorless, DC motors have been widely used in many applications, such as spindle motors for hard disk drives as well as other applications. They generally have good reliability, low weight, and accurate performance. Such motors have coils for their respective phases that are sequentially energized, or driven, to produce torque by a drive system in which the timing of application of power to respective phases is a major factor in speed control and smooth operation. Due to varying conditions in operation, the drive system is intended to be under control at substantially all times, and the timing of drive pulses, for example, can be adjusted as needed. A technology has been developed that, even without sensors, achieves good control using the back electromotive force (back EMF or BEMF) developed in a floating coil to indicate the position of a rotor of a motor.

Taking a three-phase motor as an example, with coils of each phase connected in a "Y" configuration, a drive pulse is applied to respective pairs of coils in sequence, with the third coil floating. Due to a common, center tap, connection, a back EMF is induced in the coil that is floating at that time. The back EMF can be monitored and control functions performed according to the timing of variations in the magnitude of the back EMF. The back EMF is in the general form of a sine wave. Information on the position of the motor rotor can be derived from the electrical angular position of the sine wave, particularly when a reference voltage magnitude is reached, or crossed. For example, the timing of crossings of a zero voltage of the back EMF is monitored and used in control functions.

Drive systems for motors operating disk drives and the like are generally desired to be made of circuits that can be readily integrated in a semiconductor chip and still perform with high reliability, accuracy and low power consumption. Circuits have been made that can be in discrete or integrated form using counters, with a precise clock frequency, to measure the time between events in the back EMF signal. For example, a count of the time between a pair of zero crossings (which may be immediately successive zero crossings or may be separated with some number of other zero crossings in between) can be used to determine if the sequencing of drive pulses applied by the power stage should be adjusted and to initiate corrective action.

The nature and applications of motor drives particularly for polyphase DC motors and the provision of integrated drive circuits using back EMF signals for control are explained further in the literature, for example, in "Motion Control" by R. Gariboldi appearing in *Smart Power ICs*, B. Murari et al. (Eds.), published 1995 by Springer, Berlin, Heidelberg and New York, especially pp. 248–265 relating to DC motor drives and brushless motor drives, and in U.S. Pat. Nos. 5,294,877 and 5,317,243, issued Mar. 15, 1994 and May 31, 1994, respectively, to Scott W. Cameron, which are herein incorporated by reference.

Some drive systems are operated in a linear mode with smoothly varying power continuously applied to the motor coils. Linear mode operation is favorable to detecting clean back EMF signals. However, under certain conditions, such as upon commutation of the drive between coil pairs of the motor, noise occurs that may give an inaccurate signal. A practice described in the above references is to have, in addition to a period counter (an up counter) for measuring time between reference (e.g., zero) crossings of the back EMF, other counters including a delay counter and a mask counter for helping to minimize torque ripple and to avoid inaccurate signals. Such techniques are successful, particularly in linear mode operation.

Another counter used in some prior systems is called a deceleration or monotonicity counter. It is a down counter that counts down from the count of the period counter reached in the prior up count, but at a slower rate, such as one-half the rate of the period counter. If it reaches a predetermined count, such as zero, before the period counter resets, a warning of a too-rapid deceleration is given.

In addition to the linear mode, another way of operating a drive system is in a nonlinear mode with discontinuities in application of drive current to the coils. Pulse width modulation (PWM) is a known technology for operating drives in a nonlinear mode. In PWM operation, the power to the coils follows the same overall pattern as in the linear mode but is repeatedly chopped with brief segments of on time alternating with brief segments of off time. For example, there can be PWM operation with on-off cycles repeated at a frequency of between 25 kHz to 50 kHz. In a typical on-off cycle, lasting for about 20 ms, there may be 14 ms of on time followed by 6 ms of off time, then a repeat of such a cycle would follow.

PWM operation has the attraction of lower power. However, the switching in the PWM mode causes switching noise and raises the probability of getting an inaccurate BEMF signal, despite presently known measures such as the above-mentioned mask counter and delay counter.

"Jitter" is a term sometimes used in the motor control art to characterize conditions of instability where precise detection of zero crossings and precise switching of drive current from phase to phase are not precise. The inherent nature of PWM operation makes it difficult to achieve low jitter in brushless, sensorless, motor drives because of modulation or chopping that occurs near a zero crossing.

SUMMARY OF THE INVENTION

The prior art leaves a need, for some drive systems, to be able to operate the drive in the PWM mode with more precision and with less risk of getting inaccurate BEMF signals at significant reference times in the BEMF period, such as zero crossings. Briefly, by the present invention, switching in the PWM mode is prevented when a zero crossing is anticipated and on-off switching in the PWM mode is not allowed to resume until after the zero crossing has actually occurred. Circuitry is provided to foresee when a zero crossing is approaching and then turn on an enhanced detection capability (by turning off the PWM switching).

Among the forms which the invention can take is to have a back EMF monitoring circuit, to which a BEMF signal from the floating phase is connected, with a zero (or other reference voltage) crossing detector that puts out a signal on each predetermined occurrence (which could be each zero crossing or could be a multiple number of zero crossings). Further, there is a circuit portion that measures the time between the detected zero crossings, which can be a period counter run by a clock at a certain constant frequency. The period counter is reset after each of the zero crossings. It then starts counting up until another zero crossing occurs and it is reset again.

Another circuit portion, which can be a down counter, is provided a signal or count, representing the measured time from the period counter and proceeds to determine a set time prior to the next expected zero crossing, based on the time between the prior pair. At that set time, a signal is generated to cause the driver, in one form in which the invention may be applied, to be forced on and to stay on continuously, without any further switching, (sometimes referred to as "freezing" it), until after the next zero crossing is actually detected.

A down counter can be arranged with the same clock frequency as the above mentioned period counter, which is an up counter. The count existent in the period counter just before it is reset after a second zero crossing is loaded into the down counter. The down counter counts down to a number chosen to be close to zero but enough before zero so there is no significant chance of noise interfering with detection of the zero crossing.

The invention succeeds in allowing discontinuous (PWM) operation throughout the entire operation of the drive except for a minor portion near an approaching zero crossing. When the drive is forced continuously on, e.g., either full-on consistent with PWM on status or in linear mode operation with smoothly varying drive, there is no PWM on-off or off-on switching to generate noise and perhaps produce an inaccurate reading of a zero crossing. So better BEMF information is received than is otherwise obtained in PWM operation.

All of the circuitry required is readily integrated. Existing drive circuits can be readily modified to provide the invention. The back EMF monitoring and zero crossing detector circuitry may be unchanged. Also, the period counter may be unchanged. The down counter used in the invention may be like those previously used, such as the deceleration or monotonicity counter of prior systems as described in the background, above. However, the down counter of the invention, in preferred embodiments, uses the same clock frequency as the period counter and is set to provide an output at a predetermined low count above zero, rather than at zero count.

In some forms of the invention, the same down counter may be used to perform dual functions: during operation with the same clock frequency as the period counter it serves as described above to override the PWM switching near an approaching zero crossing in accordance with the invention, and during operation with a clock frequency lower than (e.g. one-half) the clock frequency of the period counter, it functions as a deceleration or monotonicity counter, as prior similar counters have. For these dual purposes, the counter can be suitably connected to clocks of the different frequencies through a multiplexer, controlled by a signal from a drive system microprocessor. For example, the down counter can be operated as a deceleration counter during start up and as a counter to override the PWM switching near zero crossings (a "Next ZC" counter) during periods of operation in normal regulation.

These and other aspects of the invention will become more apparent from the ensuing descriptions taken with the accompanying drawings.

DESCRIPTION OF PREFERRED EMBODIMENTS

Figure 1:
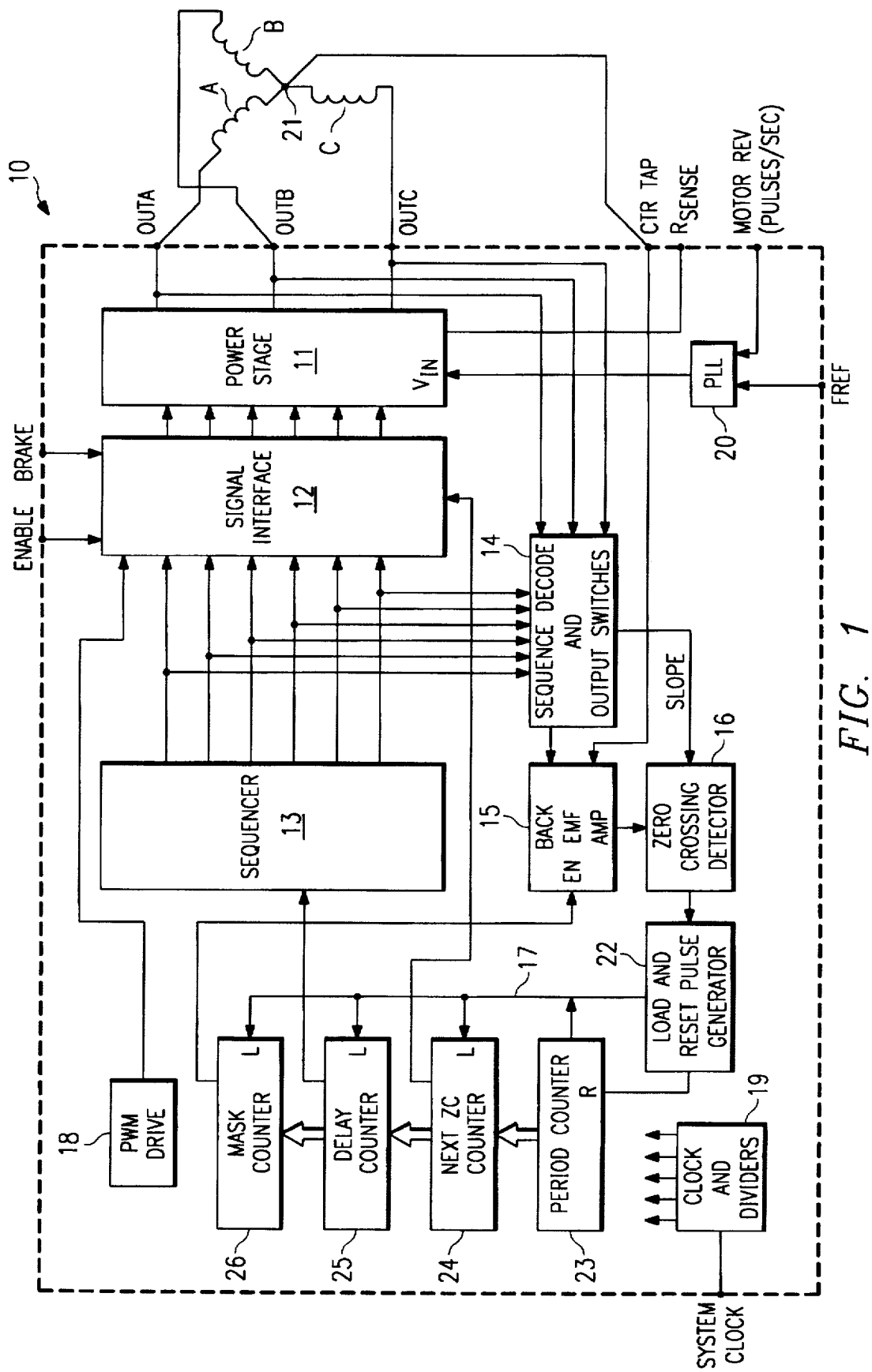
FIG. 1 is a schematic block diagram illustrating a motor controller including an embodiment of the invention.

A portion of an electrical schematic block diagram of a motor controller 10 in which the apparatus and method in accordance with a preferred embodiment of the invention may be incorporated is shown in FIG. 1. Although the motor controller 10 can be constructed of discrete components, preferably the motor controller has all the elements shown within the dashed line integrated in a single semiconductor chip. The controller 10 is adapted for connection to stator coils A, B, and C of a three phase dc brushless spindle motor, for use, for example, to turn a magnetic or other disk in systems such as computer hard disk drives, cd-rom drives, floppy disk drives, and the like, or in robotics applications, such as to drive various robotics arms or finger parts. Such three phase motor preferably has Y connected stator windings, although other winding connections can be used.

The windings can be connected to output terminals OUT A, OUT B, OUT C and CTR TAP (for the center tap of the windings), in accordance with well known practice. It should be noted that although a preferred embodiment of the invention is described with regard to a three phase motor in particular, the principles of the invention can be equally advantageously applied to polyphase motors in general.

The driving voltage is provided to the output terminal OUT A, OUT B, and OUT C by a power stage 11, which may be configured as a known type of transistor bridge. The power stage 11 is commutated or sequenced to provide sequentially controlled output signals to the output terminals OUT A, OUT B, and OUT C by a sequencer circuit 13. A signal interface circuit 12 supplies the output signals from the sequencer circuit 13 to the power stage 11 as well as enabling other functions, such as brake and output enable functions. The sequencer 13 also provides, through sequence decode and output switches 14, drive signals to other circuits of the controller circuitry to control the various aspects of rotation of the motor driven by the circuit 10. The signal interface 12 and sequencer 13 can be referred to collectively as signal sequencing and interfacing apparatus.

The output terminals OUT A, OUT B, and OUT C are switchably connected, through elements of component 14, to a circuit arranged to detect a predetermined load feedback signal which in this example is a back-emf sense amplifier 15. The back-emf sense amplifier 15 in turn delivers signals to a zero crossing detector circuit 16 which provides input signals to a digital timing circuit 17, described in more detail below.

Circuitry 18 to support pulse width modulation operation of the motor (PWM) is provided with an input to the signal sequencing and interfacing apparatus, such as to signal interface 12. The motor controller circuitry 10 also includes system clock circuitry 19 and phase lock loop (PLL) frequency/phase detector circuitry 20 and may include various other circuitry, not shown, such as "align and go" start up circuitry to facilitate start up of the motor from a stopped condition, port control logic and associated shift register circuitry to facilitate control of the motor controller circuitry by an external microprocessor (not shown), among other features previously applied in brushless motor controllers.

Individual ones of the elements shown in FIG. 1 are suitably made in accordance with prior practice and will not be described in detail herein. However, for better understanding of the timing apparatus 17 certain well known features will be described further Power stage 11 can be a conventional H-bridge, commonly referred to as a triple-½-H-bridge, of transistor switches, such as power switch FETs or DMOS transistors, operated to deliver driving currents to the windings A, B, C.

One end of each of the coils A, B, C is connected at a common center tap 21, the other ends being connected respectively to nodes OUT A, OUT B, and OUT C. In operation, during an energized phase, one node (e.g., node OUT A) is driven to a high voltage by a switch in the power stage 11 (in the upper or high side drive) and another node (e.g., node OUT B) is driven to a low voltage by another switch in the power stage 11 (in the low side drive). This is the "AB phase", with drive current flow through winding A, the center tap 21, and winding B, during which node OUT C and winding C are left floating. The coils are then switched in a commutation sequence determined by the sequencer 13 so that in each commutation phase current flows in two of the three coils, with the third coil flating. Table A identifies the floating coil in each of six sequentially operated phases of a three phase winding.

TABLE A

| Phase | Current Flows From: | To: | Floating Coil |
|---|---|---|---|
| 1 | A | B | C |
| 2 | A | C | B |
| 3 | B | C | A |
| 4 | B | A | C |
| 5 | C | A | B |
| 6 | C | B | A |

The commutation among the coils A, B, and C is performed in response to information indicating the specific position of the rotor of the motor in conjunction with circuit information indicating the desired position of the rotor. More specifically, the commutation to apply the next drive sequence of Table A is determined in response to a corresponding coil reaching a particular rotational position and its correlation with sequencer information indicating where the motor should be when a commutation is to occur. The determination of the precise rotational location of the rotor is continuously being determined by detecting occurrence of the zero crossing voltage in each non-drive, or floating, coil. More particularly, as the coils A, B, and C are switched during the commutation sequence of the rotor, the voltage of the floating coil is monitored by the back emf amplifier 15.

The back EMF is the voltage generated in the selected, floating, coil as it moves through the magnetic field produced by the energized windings. The back EMF amplifier 15 and zero crossing detector 16 are suitably of a known design and generally comprise elements so the voltage of a particular node, OUT A, OUT B, or OUT C, corresponding to a coil expected to be floating at a given time, is compared to the center tap voltage. When that node voltage becomes larger than the center tap voltage it identifies a zero, or reference, voltage crossing on the selected floating coil. Zero crossing signals are processed by the timing circuitry 17 to help perform a variety of control functions. The system can be designed to operate in response to each zero crossing or to some predetermined plurality of zero crossings. In the latter case the number may be chosen, for example, to represent one mechanical revolution of the motor driven by the motor controller.

Among the elements of the timing apparatus 17 illustrated in the embodiment of FIG. 1 are a Load and Reset Pulse Generator 22, a Period Counter 23, a "Next ZC Counter" 24, a delay counter 25, and a mask counter 26.

The pulse generator 22 is arranged as previously to provide, in sequence, a load pulse and a reset pulse upon the detection of a zero crossing that the timing apparatus is intended to respond to. The load pulse, which occurs first, transmitted to counter terminals L, causes the count existent in counter 23 at that time to be loaded into each of the other counters 24, 25 and 26 for their respective functions to be performed. The large arrows between the counters represent the data buses for transfer of the count of the period counter 23 to each of the other counters 24, 25, and 26 when the pulse generator 22 gives a load pulse. A reset pulse to terminal R occurs just after the load pulse and it resets counter 23 back to zero and that counter again proceeds to count up from zero.

The nature and operation of delay counter 25 and mask counter 26, both of which are down counters, are preferably as previously provided in controllers with BEMF zero crossing detection and reference is made to the above cited background literature The following description will primarily focus on the nature and operation of the Next ZC counter 24.

Figure 2:
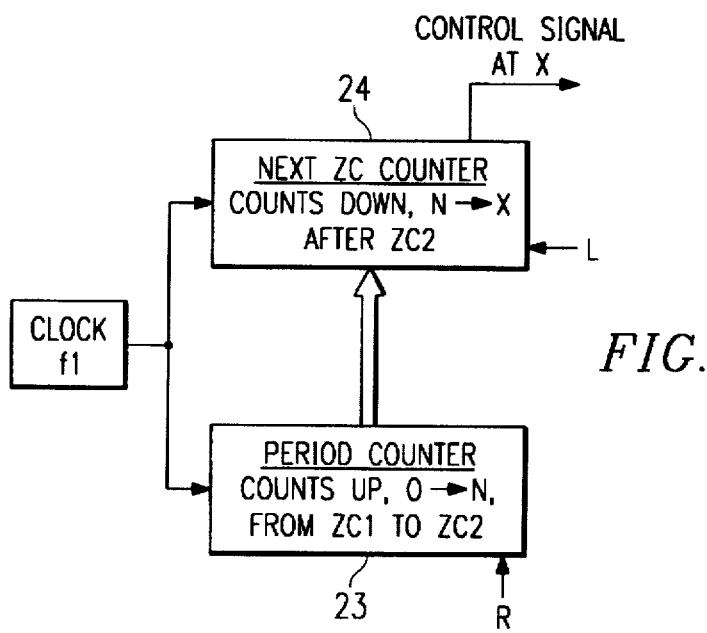
FIG. 2 is a schematic block diagram illustrating further aspects of an embodiment of the invention.
Figure 3:
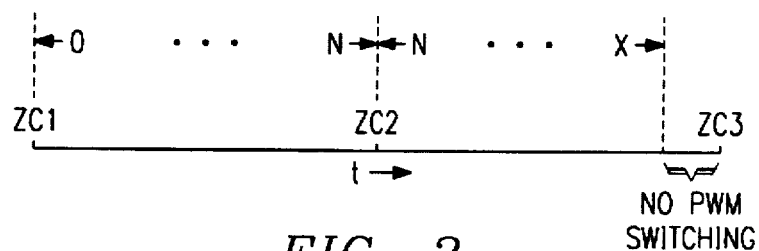
FIG. 3 is a chart or time line of the occurrence of events in an embodiment of the invention.

Referring to FIG. 2, counters 23 and 24 are schematically illustrated. FIG. 3 shows a time line on which three zero crossings, ZC1, ZC2 and ZC3 are shown. The zero crossings are substantially equally spaced as occurs while the motor is already running at normal regulation. Ignoring events prior to ZC1 for this discussion, ZC1 starts a sequence of events in which the Next ZC counter 24 plays a significant role. Period counter 23 starts out with a zero count, from having just been reset at ZC1 from whatever it was before. Counter 23 counts up at a clock frequency f1 until it reaches a count N, the count it has when ZC2 occurs (then its operation starts over).

For this discussion, we are ignoring what counter 24 is doing between ZC1 and ZC2. At ZC2, a pulse L loads the count N of counter 23 into counter 24. Counter 24 is called a Next ZC counter because it has the function of making sure accurate detection of the next zero crossing (ZC3 in this example) is not interfered with by PWM switching. If ZC3 is not accurately detected, the control system may think there is a malfunction when there is none, or possibly may respond to an abnormal condition which does not actually exist.

Counter 24 counts down, also at clock frequency f1, from N and continues counting until a certain desired count x, above zero, is reached. Since the count frequency is the same as for the period counter (which is convenient but not the only situation that would be suitable) and since the interval between zero crossings should be the same, counter 24 normally reaches count x before ZC3 occurs. At that time, the number x is decoded from the counter 24 and used to generate a control signal to the signal sequencing and interfacing apparatus 12–13 of the system (or it could go to the PWM circuitry 18 which can be considered part of the signal sequencing and interfacing apparatus for purposes of this discussion). The timing control signal from counter 24 is to make sure the drive is on from that time at count x until the next zero cross ZC3 is actually detected.

The counter 24 foresees that ZC3 is about to occur. Even if it occurred at exactly a zero count in counter 24, i.e., the interval from ZC2 to ZC3 was exactly the same as the interval from ZC1 to ZC2, and no irregularity in the system is occurring, PWM switching could otherwise interfere with accurately reading ZC3. The control signal from counter 24 can be used to stop PWM switching by, for example, forcing on the upper drive portion (possibly also the lower drive portion) of the power stage 11. If the drive was on before, when the control signal is generated, it stays on. If it was off at that time, due to a PWM off time, then it is turned on and kept on. Doing so clears the way so the BEMF monitor 15 and AC detector 16 are not confused at the time ZC3 does occur.

The circuitry is designed so that after ZC3, PWM switching resumes. Also, the operation of the counters proceeds with counter 24 being loaded with a count reached by counter 23 between ZC2 and ZC3 and counting down to a count x before the next anticipated zero crossing where the drive would again be forced and kept on. The process is repeated for successive zero crossing events with PWM switching stopped prior to an anticipated event to allow it to be accurately detected.

"X" is some number of counts chosen to be near the anticipated ZC3 but not so near that ZC3 has a reasonable probability of occurring first or of occurring when PWM switching noise exists. Merely by way of example, if the clock period (inverse of the frequency f1) is 6.4 ms and if x is a count of 3, the time between the control signal at x and the anticipated ZC3 is 19.2 ms (out of a total period of about 700 ms). That is short enough to enjoy the benefits of PWM operation almost all of the time and also is short enough not to encounter a serious risk, in many systems, of losing control of the current (discussed more below). The interval of 19.2 ms is also long enough to ensure that BEMF zero crossing detection occurs far enough from any switching noise that could interfere.

In PWM operation, the coil current rises in each on time and then decays during the next off time. It is possible, using the numerical examples mentioned above, for the drive to have a normal on time (e.g. 14 ms) just prior to the detection window signal (i.e., the signal that stops PWM switching) provided by this invention. Then the drive stays on for a further time (e.g., 19.2 ms) so a continuous on time of nearly 35 ms can be reached. While not a condition normally desired, this is not expected to create a problem and the benefit of the invention outweighs any likely disadvantage in most cases. Typical motors used in the applications of interest have 8 or 12 poles. The windings that are individually driven therefore number 24 or 36, in a 3 phase motor The system achieves normal regulation as soon as the zero crossing is detected because the time the PWM switching was off, and the drive was forced on, was short and affected only a small part of the system.

An alternative, but less preferred, form of the invention is to have the drive freeze in whatever on or off condition it is in when the count of x is reached. Such an arrangement would relieve concerns regarding a too-high rise in the coil current due to extra on time and may be warranted in some applications.

It is to be understood that broader aspects of the invention apply regardless of what operating strategy is employed after the PWM switching is stopped. That is, once a signal is developed that foresees an approaching zero crossing, a number of different means for operating in a way to allow accurate detection of BEMF may be employed including the technique of forcing the drive and keeping it on or leaving the drive in the on or off state it is in at the time. A third technique is to switch to linear mode operation. The drive proceeds to be "on" with smoothly varying drive signals (rather than "full-on" as contemplated above with retention of nonlinear PWM operation where the drive is either fully on or off). Low jitter BEMF detection is available in the linear mode since there is no chopping. Care is to be taken so transitions between modes are performed smoothly and so each mode is fully operational when needed. One may employ features of systems described in copending application Ser. No. 08/488,370, filed Jun. 7, 1995 by Li et al. and assigned to the assignee of the present invention, which is herein incorporated by reference, for techniques to enable smooth transitions between modes.

A major advantage of the present invention is how relatively easy it is to implement in existing motor controls in integrated circuits. As mentioned in the background (also see aforementioned U.S. Pat. No. 5,294,877) it is known to have the back EMF monitor 15 and ZC detector 16 with ZC events used to trigger an up counter 23 which reaches a count then loaded in some down counters, such as 25 and 26, for specified functions. Another down counter disclosed in the background material is a monotonicity or deceleration counter. It runs on a slower frequency than the period counter and if its count reaches a certain number, such as zero, before being loaded with a new count from the period counter at a zero crossing a warning signal is given that the motor has decelerated appreciably.

The Next ZC counter 24 may be constructed similarly to such a deceleration counter, although operated quite differently as will be explained. A controller may have a Next ZC counter 24 with or without a deceleration counter in the system. In one preferred embodiment, the same counter apparatus is arranged so that it can be selectively operated either as a Next ZC counter or as a deceleration counter.

Figure 4:
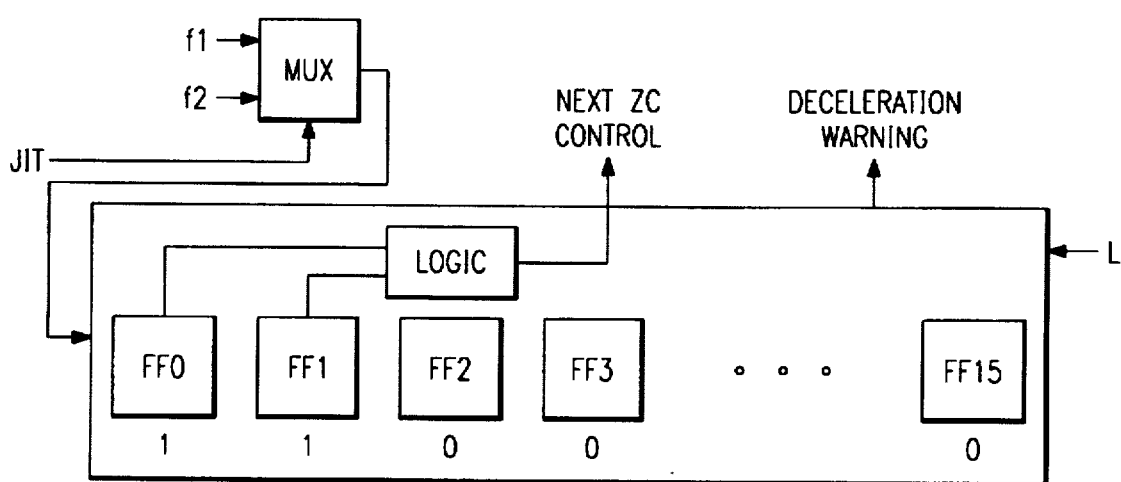
FIG. 4 is a generalized schematic of an example of a counter applicable to the invention.

An arrangement is shown in FIG. 4 for using a counter 24' as either a Next ZC counter or as a deceleration counter. The counter 24' is like previous down counters used as deceleration counters, in most respects. It comprises a series of conventional flip-flops of some number, for example, sixteen, numbered FF0 through FF15. The flip-flops are bistable elements and are interconnected to perform as a binary counter (interconnections not shown). FF0 can have a count of $2^0$, FF1 a count of $2^1$, etc. The counter generates an output signal upon a certain number being present in the counter.

Clock signals at frequencies f1 and f2 are supplied to a multiplexer MUX that is controlled by a serial bit signal ("JIT") from the system microprocessor, a "0" determining the selection of one clock frequency, such as f1, and a "1" the other. While the value of the JIT signal may be variously controlled by the microprocessor, one protocol employed is to have f2 applied to the counter during start up and f1 applied when the drive is in normal regulation.

The frequency f1 is a frequency matching that of the period counter 23, f2 is a slower frequency, such as ½ f. When f1 is selected, counter 24' operates as a Next ZC Counter as does counter 24 of FIG. 2. In this example, counter 24' is configured with logic, not shown in detail, to provide an output Next ZC control signal when the counter reads a count of three, or binary "110 . . . ". When clock frequency f2 is selected, the counter counts down slowly and produces a deceleration warning if the count reaches a number, which for example may also be three, indicating no zero crossing has occurred for nearly twice the normal period.

It is therefore seen that the counters 24 and 24' may be designed in accordance with well known techniques for sequential logic. Likewise, the application of a control signal from the Next ZC counter to stop PWM switching can be arranged in a straightforward manner. For example, the Next ZC control signal can be one input to a logic circuit at the signal interface 12 that has other inputs including the JIT signal from the microprocessor and a PWM signal where each signal is a "0" or "1". The logic circuit, in one or more stages, processes the signals so that, essentially, when PWM is running, and the JIT bit is present and the Next ZC signal has been given (e.g. at the count of three), that the PWM chopping will cease until after the Next ZC signal changes state due to a zero crossing occurrence.

It is to be understood that the apparatus and method of the invention may be practiced in various forms in addition to those specifically shown or described herein and that numerous changes may be made by those skilled in the art without departing from the spirit and scope of the invention.

What is claimed is:

1. Circuitry for driving a polyphase load, the circuitry comprising:

a power stage having a plurality of output terminals for connection with respective phases of the load;

signal sequencing and interfacing apparatus connected to deliver sequentially commutated input signals to the power stage;

timing apparatus connected with the signal apparatus and comprising a first circuit portion arranged to monitor a load feedback signal to detect an occurrence of a predetermined value, a second circuit portion arranged to determine a time interval between specified occurrences of the predetermined value of the load feedback signal, and a third circuit portion arranged to detect when a present interval between specified occurrences of the predetermined value of the load feedback signal is at a set time prior to a next expected occurrence of the predetermined value according to the prior time interval determined by the second circuit portion and to cause a timing control signal to go to the signal apparatus at said set time.

2. The circuitry of claim 1 wherein:

the timing apparatus, signal apparatus and PWM circuitry are arranged so the power stage is maintained continuously on, without interruption by PWM operation, during an override time segment between said set time and occurrence of the next actual load feedback signal of the predetermined value.

3. The circuitry of claim 2 wherein:

the signal apparatus, in response to the timing control signal, is maintained fully on during the override time segment.

4. The circuitry of claim 2 wherein:

the PWM circuitry, in response to the timing control signal, is disabled during the override time; and the circuitry further comprises linear mode circuitry connected with the signal apparatus for linear mode operation of the power stage during the override time segment.

5. The circuitry of claim 1 wherein:

the first circuit portion of the timing apparatus comprises a zero crossing detector for detecting zero crossings of load feedback signals, which are back EMF signals received from a floating phase of the polyphase load;

the second circuit portion of the timing apparatus comprises a period counter that counts faster than the occurrence of the zero crossings, during a first of said time intervals between specified occurrences of the zero crossing signals;

the third circuit portion of the timing apparatus comprises a Next ZC counter that has the capability to count also faster than the occurrence of the zero crossings, during a second of said time intervals, following said first time interval, to said set time prior to the next expected zero crossing according to the duration of first time interval determined by the period counter.

6. The circuitry of claim 5 wherein:

the period counter is an up counter reaching a count for the first time interval and the Next ZC counter is a down counter that counts down at the same frequency that the period counter counts up, the Next AC counter being arranged to cause the timing control signal at a predetermined number of counts in the second time interval near to but before the occurrence of the count reached by the period counter in the first time interval.

7. The circuitry of claim 5 wherein:

the period counter is an up counter that counts at first frequency f1;

the Next ZC counter is a down counter that has inputs arranged to operate it selectively at the frequency f1 or at a second frequency f2, slower than f1; and the timing apparatus further comprises a multiplexer connected with the Next ZC counter for selecting between f1 and f2.

8. The circuitry of claim 7 wherein:

the multiplexer has control inputs to allow the Next ZC counter to operate at frequency f2 during certain times of operation of the circuitry and to operate at frequency f1 at other times, whereby when operating at f1 the Next ZC counter operates to provide said timing control signal and when operating at f2 the Next ZC counter operates to provide a deceleration output signal when its count reaches a predetermined count prior to occurrence of the next specified occurrences of the zero crossings.

9. In timing control circuitry of a driver for a polyphase DC motor operated in a pulse width modulation (PWM mode, the combination comprising:

a zero crossing detector connected to receive an input signal related to a waveform of back EMF from a floating phase of the motor and to generate an output pulse upon occurrence of zero crossings of the input signal;

a period counter counting up between occurrences of zero crossings and then resetting;

a down counter, arranged to be loaded with a maximum count from the period counter, said down counter counting down to a predetermined count above zero at which a timing control signal is produced to ensure the driver is on, and not in a PWM off segment, when a next zero crossing occurs.

10. The combination of claim 9 wherein:

the period counter and the down counter count at substantially the same frequency, and the predetermined count of the down counter is about three or fewer counts from zero.

11. The combination of claim 9 wherein:

the down counter is connected through switch apparatus to two clock frequencies, a first frequency having substantially the same frequency as the period counter and a second frequency having a lower frequency than the period counter;

said switch apparatus having a control terminal to selectively change between the two clock frequencies whereby during operation at the first frequency said timing control signal to ensure the is produced and during the operation at the second frequency the down counter serves to give a deceleration signal at times when its count reaches a predetermined count before the period up counter loads it with a new count.

12. A circuit for maintaining capability of precise detection of signals indicating position of a motor rotor, for use in motor speed control, in a drive system of a polyphase motor that utilizes frequent on-off and off-on transitions of the drive to coils of respective phases of the motor, with resulting ability to achieve reduced power consumption compared to continuous operation, during the sequential energization of the polyphase coils, the circuit comprising:

a back EMF monitor that receives a BEMF signal from the coils of each phase when it is floating during a period when other phases are energized;

a reference voltage detector that determines when BEMF signals are at a predetermined reference voltage magnitude and generates crossing signals on selected occurrences of the predetermined reference voltage magnitude;

timing apparatus that determines time intervals between the selected occurrences of the predetermined reference voltage magnitude and, after one of said time intervals between a first and a second selected occurrence, has capability to use a duration of said one time interval to time a control signal that forces the drive on, without an on-off transition, from a time before a next expected selected occurrence until after a third selected occurrence has actually been determined by the reference voltage detector.

13. The circuit of claim 12 further comprising:

a pulse generator for producing first and second sequential pulses to the timing apparatus when said reference voltage detector determines occurrence of the predetermined reference voltage magnitude.

14. The circuit of claim 13 wherein:

the timing apparatus comprises a first counter connected to be reset by the second pulse from the pulse generator, and a second counter connected to be loaded with the count existent in the first counter at the first pulse from the pulse generator.

15. The circuit of claim 14 wherein:

the timing apparatus further comprises a first clock producing timing pulses at a frequency f1, the first clock pulses being delivered to both of the first and second counters to be counted.

16. The circuit of claim 15 wherein:

the first counter is an up counter and the second counter is a down counter, said second counter being arranged to produce said control signal that forces the drive on when its count is between the count existent in the first counter with which it was loaded and a count of zero.

17. The circuit of claim 14 wherein:

the first counter is an up counter and the second counter is a down counter, the timing apparatus further comprises a first clock and a second clock producing timing pulses at respective frequencies f1 and f2 with frequency f2 slower than f1, the first counter is arranged to receive and count the first clock pulses, the second counter is switchably connected to said clocks whereby it is arranged to selectively receive and count first clock pulses to produce said control signals and has an alternatively available capability during selected periods of operation of the drive system to receive and count second clock pulses to produce a deceleration signal indicating a longer time interval between a pair of the selected occurrences of the predetermined reference voltage magnitude than a preceding one of said time intervals.

18. The circuit of claim 12 wherein:

the reference voltage detector determines when BEMF signals are at a predetermined reference voltage magnitude of zero, at a zero crossing of the BEMF waveform, and the reference voltage detector generates said crossing signals at occurrence of a predetermined integral number of the crossing signals.

19. The circuit of claim 16 wherein:

the second counter comprises a series of flip-flops with a predetermined one of said flip-flops being interrelated with second counter logic that produces said control signal at the specified time, at a count within about 50 ms of a zero count.

20. The circuit of claim 17 wherein:

the second counter is switchably connected to the first and second clocks by a multiplexer under the control of a drive system microprocessor.

21. The circuit of claim 19 wherein:

the drive system comprises a power stage that receives signals from a signal interface circuit connected with logic for processing said control signal from said second counter logic to produce a signal to the signal interface forcing the drive on.

22. The circuit of claim 16 wherein:

said second counter is in addition to one or more other down counters in the timing apparatus that are loaded with said count existent in the first counter.

23. A method of accurately detecting when a predetermined back EMF reference voltage crossing, such as a zero crossing, develops in a floating phase of a polyphase motor, despite normal operation of the motor with drive power applied by a drive system in a discontinuous, or nonlinear, mode, such as a PWM mode, so that the reference crossing signals are available for use for control functions in the drive system, comprising the steps of:

measuring a period between a first set of the reference crossing signals;

determining a pre-crossing time at a predetermined interval before the anticipated end of a second set of the reference crossing signals based on the prior measured period;

stopping discontinuities in drive signals applied to the drive system so drive power is applied continuously from the pre-crossing time until a subsequent reference crossing signal to conclude the second set has actually occurred.

24. The method of claim 23 wherein:

the measuring of a period comprises measuring between first and second successive zero crossing signals; and the determining of a pre-crossing time comprises determining a point following said second successive zero crossing signal before occurrence of a third successive zero crossing signal.

25. The method of claim 23 wherein:

the measuring of a period comprises counting up at a count frequency f from the first of the first set of the reference crossing signals to a period count existent upon the last of the first set of the reference crossing signals; and the determining of a pre-crossing time comprises counting down from the period count reached in said counting up at the same count frequency f to a pre-crossing count above zero.

26. The method of claim 25 further comprising:

returning to discontinuous nonlinear mode operation after the subsequent reference crossing signal has actually occurred, and repeatedly performing said measuring, determining, stopping and returning steps for subsequent sets of the reference crossing signals.

27. The method of claim 26 wherein:

the determining of the pre-crossing time comprises setting the pre-crossing count at a count close to the anticipated end of a subsequent set of reference crossing signals to allow operation in the nonlinear mode over a major portion of total operation of the drive system.

28. The method of claim 27 wherein:

in the measuring and determining steps, the sets of reference crossing signals consist of a plurality of individual reference crossing signals.

29. The method of claim 28 wherein:

the plurality of individual reference crossing signals consists of a number of such signals representing one mechanical revolution of the polyphase motor.

30. The method of claim 23 wherein:

the stopping of discontinuous drive power comprises maintaining the drive power at its maximum throughout the duration of continuous application of drive power.

31. The method of claim 23 wherein:

the stopping of discontinuous drive power comprises maintaining a linearly varying mode of operation throughout the duration of continuous application of drive power.

* * * * *